United States Patent
Brundidge et al.

(10) Patent No.: US 7,685,461 B2
(45) Date of Patent: Mar. 23, 2010

(54) METHOD, APPARATUS AND PROGRAM STORAGE DEVICE FOR PERFORMING FAULT TOLERANT CODE UPGRADE ON A FAULT TOLERANT SYSTEM BY DETERMINING WHEN FUNCTIONAL CODE REACHES A DESIRED STATE BEFORE RESUMING AN UPGRADE

(75) Inventors: Jimmie Lee Brundidge, Durham, NC (US); Chiahong Chen, Oro Valley, AZ (US); Itzhack Goldberg, Hadera (IL); Daniel Anson Heffley, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 11/614,076

(22) Filed: Dec. 20, 2006

(65) Prior Publication Data

US 2008/0155322 A1 Jun. 26, 2008

(51) Int. Cl.
*G06F 11/00* (2006.01)
(52) U.S. Cl. .............................. 714/6; 717/171; 717/173
(58) Field of Classification Search .................. 717/171
See application file for complete search history.

(56) References Cited

U.S. PATENT DOCUMENTS

| 5,966,301 A * | 10/1999 | Cook et al. ..................... 700/3 |
|---|---|---|
| 6,363,499 B1 * | 3/2002 | Delo et al. ..................... 714/15 |
| 6,438,749 B1 * | 8/2002 | Chamberlain ................ 717/174 |
| 6,675,258 B1 * | 1/2004 | Bramhall et al. ............. 711/114 |
| 6,678,883 B1 | 1/2004 | Berry et al. |
| 6,681,389 B1 * | 1/2004 | Engel et al. .................. 717/173 |
| 6,681,390 B2 * | 1/2004 | Fiske .......................... 717/173 |
| 6,836,859 B2 * | 12/2004 | Berg et al. ..................... 714/36 |
| 6,986,133 B2 * | 1/2006 | O'Brien et al. ............. 717/173 |
| 7,028,177 B2 | 4/2006 | Schultz et al. |
| 7,032,218 B2 | 4/2006 | Shirasawa et al. |
| 7,080,371 B1 * | 7/2006 | Arnaiz et al. ................ 717/170 |
| 7,085,957 B2 * | 8/2006 | Sundareson et al. ............. 714/6 |
| 7,506,194 B2 * | 3/2009 | Appanna et al. ................ 714/3 |
| 2004/0054995 A1 * | 3/2004 | Lee ............................. 717/173 |
| 2004/0103400 A1 | 5/2004 | Johnsen et al. |
| 2006/0004779 A1 | 1/2006 | Rossiter et al. |
| 2006/0020937 A1 | 1/2006 | Schaefer |

FOREIGN PATENT DOCUMENTS

JP 2004-280653 10/2004

* cited by examiner

*Primary Examiner*—Christopher S McCarthy
(74) *Attorney, Agent, or Firm*—William K. Konrad; Konrad Raynes and Victor LLP (57) ABSTRACT

A method, apparatus and program storage device for performing fault tolerant code upgrade on a fault tolerant system by determining when functional code reaches a desired state before resuming an upgrade. A concurrent code-load to a plurality of storage controllers of a storage system is initiated. A role transition is detected. The storage system determines when the storage system returns to a desired state. The code-load is resumed when the storage system returns to the desired state.

20 Claims, 5 Drawing Sheets

METHOD, APPARATUS AND PROGRAM STORAGE DEVICE FOR PERFORMING FAULT TOLERANT CODE UPGRADE ON A FAULT TOLERANT SYSTEM BY DETERMINING WHEN FUNCTIONAL CODE REACHES A DESIRED STATE BEFORE RESUMING AN UPGRADE

CROSS-REFERENCE TO RELATED APPLICATIONS

This application is related to commonly-assigned U.S. patent application Ser. No. 11/614,080, filed on Dec. 21, 2006 the same date herewith, by Jimmie L. Brundidge, Chiahong Chen, Itzhack Goldberg, and Yotam Medini, entitled "METHOD, APPARATUS AND PROGRAM STORAGE DEVICE FOR PROVIDING AUTOMATIC RECOVERY FROM PREMATURE REBOOT OF A SYSTEM DURING A CONCURRENT UPGRADE":

BACKGROUND OF THE INVENTION

1. Field of the Invention

This invention relates in general to a computer systems, and more particularly to a method, apparatus and program storage device for performing fault tolerant code upgrade on a fault tolerant system by determining when functional code reaches a desired state before resuming an upgrade.

2. Description of Related Art

A storage system uses a storage controller to control a plurality of magnetic disks so that redundant information as well as information to be stored are stored in the magnetic disks in a distributed manner. For example, many controllers offer a wide variety of RAID levels such as RAID 1, RAID 5, RAID 0+1 and many other algorithms to ensure data availability in the event of the failure of an individual disk drive. In this case, the hosts do not see devices that correspond directly to the individual spindles; rather the controller presents a virtual view of highly available storage devices to the hosts called logical devices. Accordingly, when one of the magnetic disks fails, the storage controller can recover the information in the failed magnetic disk according to the redundant information. Then, a normal operation can be performed again.

In addition, a storage controller may be configured with a plurality of storage clusters, each of which provides for selective connection between a host computer and a direct access storage device and each preferably being on a separate power boundary. Each cluster might include a multipath storage director with first and second storage paths, a cache memory and a non-volatile storage ("NVS") memory.

In most of today's storage products, usually two or more controllers are used to provide redundancy. This redundancy is necessary is to prevent interruption of service in case of a software or hardware failure on one of the controllers. In addition, this redundancy becomes very handy when providing new software updates.

However, during the upgrade there is always the possibility that the functional-code might "misbehave" and initiate an unexpected role transition due to the underlying fault tolerant system. For example, the functional code can initiate a failover and/or failback such that a fully operational system transitions into a single operational node without any regard to the current code-load process. A failover occurs when one controller relinquish its duties to the other controller while maintenance is performed on itself. A failback occurs when maintenance is completed and the controller is ready to regain control of its duties. The system may resumes dual node operation upon failback. Having these two independent and sometime conflicting threads of operations will cause the current code-load to fail.

Having a code-load process that can sustain such unavoidable incidents, and carry out the code-load despite such occurrences, to a successful completion, will result in a higher success concurrent-code-load ratio and less support cases and expenses.

One possible solution is to have the functional-code communicate its state transition to the code-load process. However, such a mechanism would be rather complex as well as error prone. To avoid such complexity, the code-load may be simply re-initiated at a later time. Nevertheless, merely waiting to retry the load later does not guarantee success. The system may discover another error and perform another error recovery, which could lead to another code upgrade failure and consequently another delay waiting until a later time to retry the code-load.

It can be seen that there is a need for a method, apparatus and program storage device for performing fault tolerant code upgrade on a fault tolerant system by determining when functional code reaches a desired state before resuming an upgrade.

SUMMARY OF THE INVENTION

To overcome the limitations in the prior art described above, and to overcome other limitations that will become apparent upon reading and understanding the present specification, the present invention discloses a method, apparatus and program storage device for performing fault tolerant code upgrade on a fault tolerant system by determining when functional code reaches a desired state before resuming an upgrade.

The present invention solves the above-described problems by determining when the system undergoes some unplanned transition and thus wait for the functional code to transition to a desired steady state so that the code-load-process can continue its job instead of declaring a code-load-failure upon any deviation from an expected scenario. The method is self-sustained and as such insensitive to internal changes within the functional code itself.

A program product in accordance with the principles of the present invention includes a computer readable medium embodying at least one program of instructions executable by a computer to perform operations to provide fault tolerant code upgrades on a fault tolerant system. The operations include initiating a concurrent code-load to a plurality of storage controllers of a storage system, detecting a role transition, determining when the storage system returns to a desired state and resuming the code-load when the storage system returns to the desired state.

In another embodiment of the present invention, a system is provided. The system includes a processor and memory, coupled to the processor, the memory includes a computer usable medium embodying at least one program of instructions to perform operations, the operations including initiating a concurrent code-load to a plurality of storage controllers of a storage system, detecting a role transition, determining when the storage system returns to a desired state and resuming the code-load when the storage system returns to the desired state.

In another embodiment of the present invention, a method for providing fault tolerant code upgrades on a fault tolerant system is provided. The method includes initiating a concurrent code-load to a plurality of storage controllers of a storage system, detecting a role transition, determining when the storage system returns to a desired state and resuming the code-load when the storage system returns to the desired state.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method, apparatus and program storage device for performing fault tolerant code upgrade on a fault tolerant system by determining when functional code reaches a desired state before resuming an upgrade. When the system determines that an unplanned transition has occurred, the system determines when the functional code transitions to a desired steady state before the code-load process continues its job instead of declaring a code-load-failure upon any deviation from an expected scenario. The method is self-sustained and as such insensitive to internal changes within the functional code itself.

Figure 1:
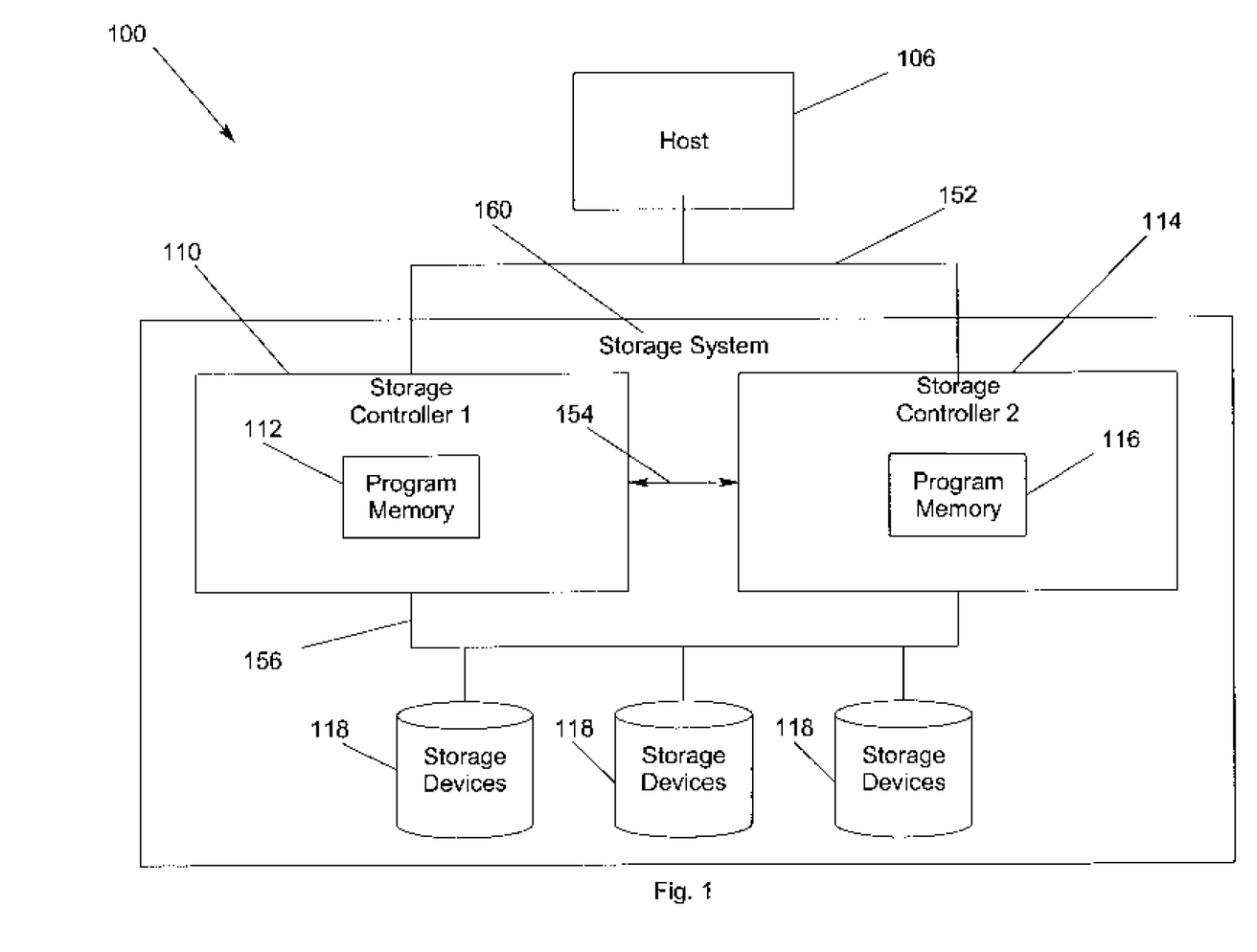
FIG. 1 illustrates a computer storage system according to an embodiment of the present invention.

FIG. 1 illustrates a computer storage system 100 according to an embodiment of the present invention. In FIG. 1, first and second storage controllers 110 and 114 cooperate in accordance with the present invention to control read and writes to storage system 160. A host system 106 is shown coupled to the first and second storage controllers 110 and 114 via path 152. Host system 106 may direct I/O requests via path 152 to either or both of first and second controllers 110 and 114. For example, host system 106 may detect an error in accessing a volume of storage system 160 via one controller (i.e., 110 or 114) and re-issue the I/O request to the alternate controller automatically. Such errors may include an explicit error status returned from the first controller or timeouts due to an unresponsive controller. First and second controllers 110 and 114 also include capabilities to transfer ownership of storage volumes in the system from one controller to another as required to complete an I/O request sent to the storage system 160 by host system 106. The re-issued I/O request are therefore processed by an appropriate one of the controllers that presently owns the identified storage volume of the request and is operable to process the I/O request.

Inter-controller communication path 154 may be provided to allow communications between controllers 110 and 114 required to coordinate such transfer of ownership of storage volumes. Storage controllers 110 and 114 store and retrieve data on storage devices 118 via path 156. First and second controller 110 and 114 perform storage management on the storage devices 118. In particular, first and second controllers 110 and 114 perform RAID management to improve reliability of the storage system 160 and to improve overall performance of the system. It is common that the plurality of storage devices 118 are logically subdivided by operation of the controllers 110 and 114 into subsets. Such subsets may be referred to as volumes or storage volumes. In the case of RAID storage management, it is common to refer to the subsets as logical units or LUNs or redundancy groups. As used herein, the term volume or storage volume is intended to represent all such logical groupings that subdivide the disk drives. It should be noted that the subdivision may be as simple as defining a single storage volume that includes all disk drives of the system.

Controller 110 includes program memory 112 for storing firmware that, when executed, defines operation of controller 110. In like manner, controller 114 includes program memory 116 for storing its operational firmware. It is critical in such a multiple controller environment to ensure compatibility between revisions of firmware operating in the cooperating multiple controllers 110 and 114. Accordingly, reliable and robust synchronization and updating of the firmware resident and operating in storage controllers 110 and 114 is needed.

As shown in FIG. 1, second controller 114 may be any number of other controllers in storage system 160. A first controller 110 is often identified as a primary controller and is responsible for management functions. Any number of second controllers 114 may operate in conjunction with primary controller 110. Those skilled in the art will recognize that the first controller 110 may perform the methods defined herein in conjunction with any number of second controllers.

Those skilled in the art will recognize that the various communication paths 152 through 156 may be any of several well-known, standard communication media and protocols, e.g., a simple serial connection, a network connection, a SCSI connection, a parallel SCSI connection, a Fibre Channel connection, or any of several other standard communication media and protocols.

Figure 2:
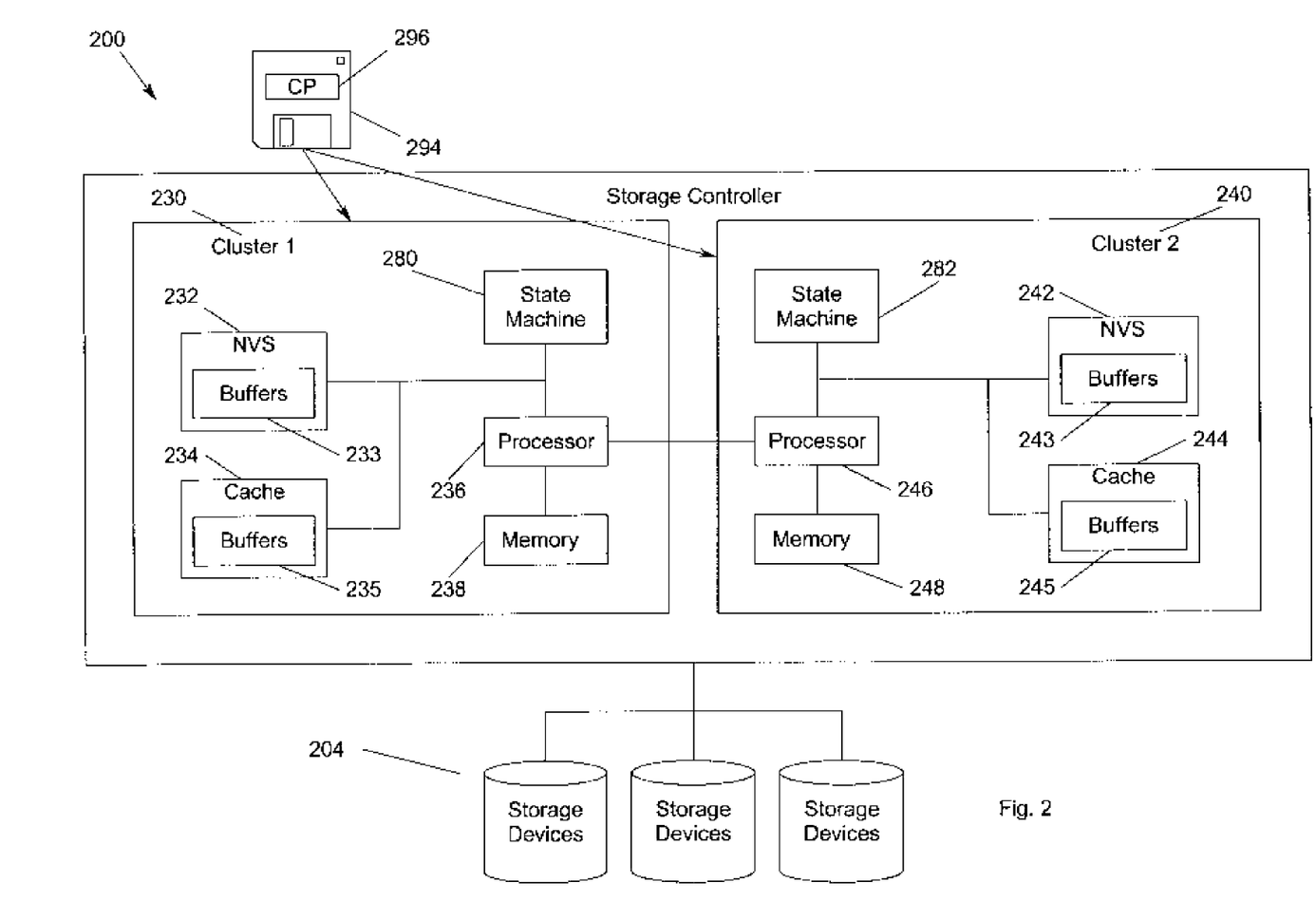
FIG. 2 is a block diagram of a storage controller according to an embodiment of the present invention.

FIG. 2 is a block diagram of a storage controller 200 according to an embodiment of the present invention. The storage controller 200 is configured in a dual-cluster mode. However, those skilled in the art will recognize that the storage controller 200 of FIG. 2 is provided merely as an example and that the invention is not limited to a particular configuration. In FIG. 2, the storage controller 200 is coupled through appropriate adapters or interfaces to one or more host devices, also through appropriate adapters or interfaces to one or more physical storage devices 204, such as magnetic disk drives, optical disc drives or NVRAM storage devices.

The storage controller 200 may be configured to include one or more clusters, such as first and second cluster 230 and 240. Each cluster 230 and 240 may be configured to include a non-volatile storage memory (NVS) 232 and 242 and temporary storage, such as cache memory 234 and 244, as well as a processor 236 and 246 and operating memory 238 and 248. The processors 236 and 246 are able to communicate with each other and supervise all operations of the respective clusters 230 and 240 by executing instructions stored in the operating memory 238 and 248.

A portion of each NVS memory 232 and 242 is allocated to buffers 233 and 243, respectively. Similarly, a portion of each cache memory 234 and 244 is allocated to buffers 235 and 245, respectively. In the configuration illustrated in FIG. 2 of the NVS and cache of the two clusters, the NVS 232 and cache 234 of the first cluster 230 are of the same size as the NVS 242 and cache 244 of the second cluster 240. The amount of space allocated to buffers may be a predetermined proportion of the total memory, e.g., NVS or cache as the case may be. Thus, the amount of the NVS memory allocated to buffers is preferably the same as the amount of the cache memory allocated to buffers, with the balance dedicated to storing customer data. However, it will be appreciated that other configurations of NVS, cache and buffers in the clusters may be implemented.

Generally, the software, the storage controller 200 and the instructions derived therefrom, are all tangibly embodied in a computer-readable medium, e.g. one or more of the data storage devices 294. Moreover, instructions 296 when read and executed by the storage controller 200, causes the storage controller 200 to perform the steps necessary to implement and/or use the present invention. Under control of an operating system, the storage controller 200, and the instructions 296 may be loaded from the data storage device 294 into the storage controller, e.g., processors 236, 246, memories 238, 248, NVS 232, 242, etc., for use during actual operations.

The present invention may be embodied as a method, apparatus, or article of manufacture and may be implemented as software, firmware, hardware, or any combination thereof. The term "article of manufacture" (or alternatively, "computer program product") as used herein is intended to encompass a computer program accessible from any computer-readable device, carrier, or media. Those skilled in the art will recognize many modifications may be made to this configuration without departing from the scope of the present invention.

Figure 3:
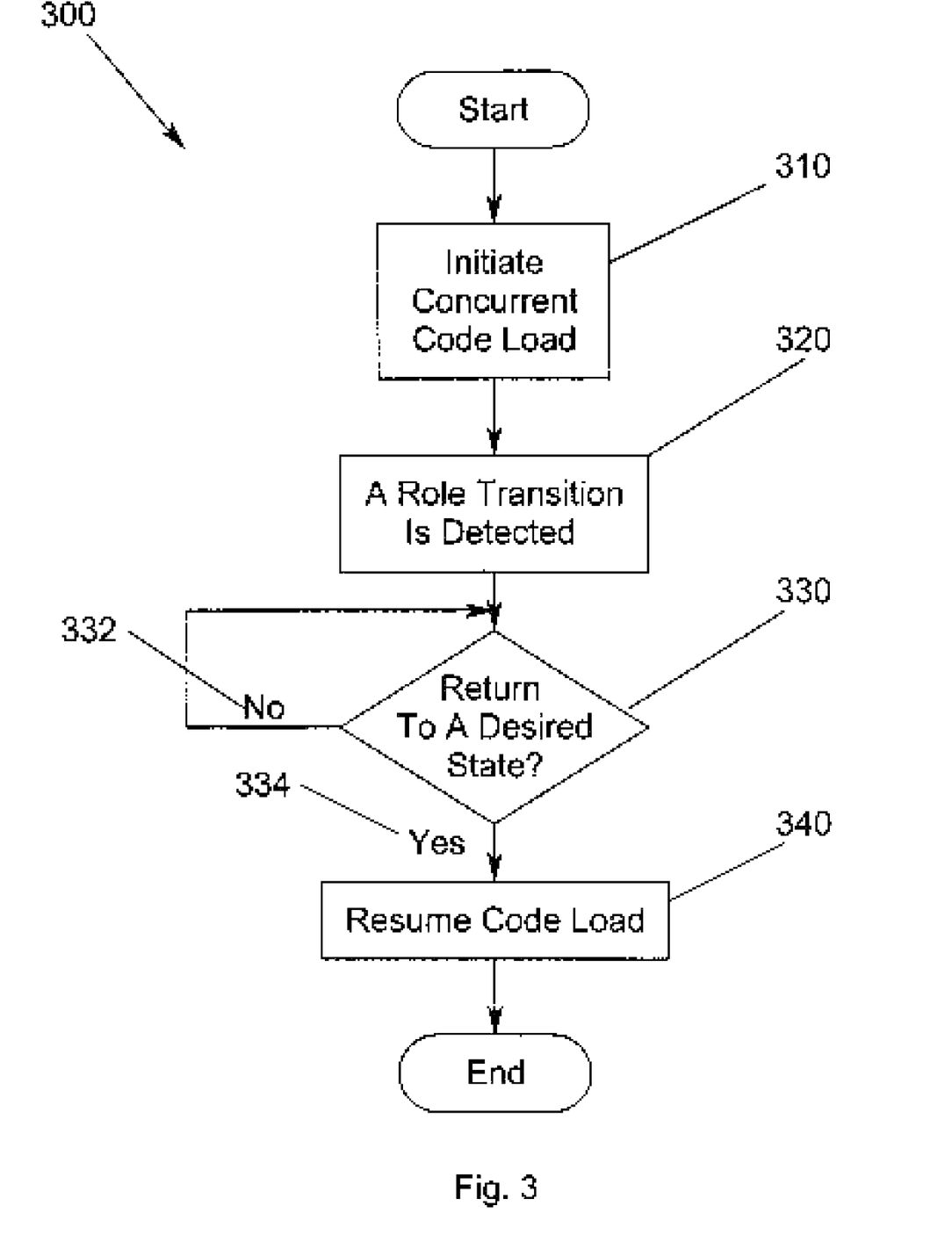
FIG. 3 is a flow chart of a method for providing fault tolerant code upgrades on a fault tolerant system according to an embodiment of the present invention.
Figure 4:
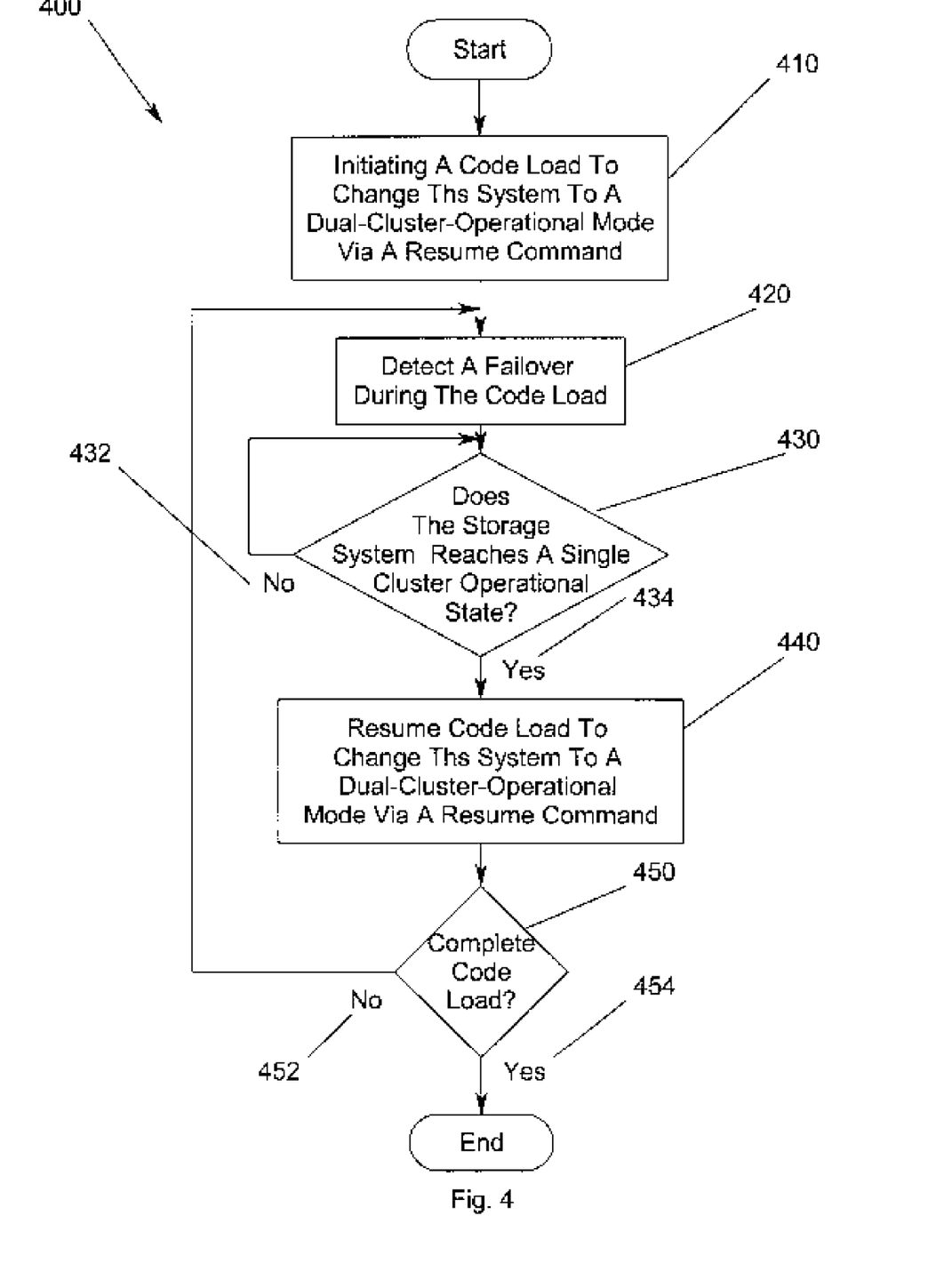
FIG. 4 is a flow chart of a method for performing a resume command to provide fault tolerant code upgrades on a fault tolerant system according to an embodiment of the present invention.
Figure 5:
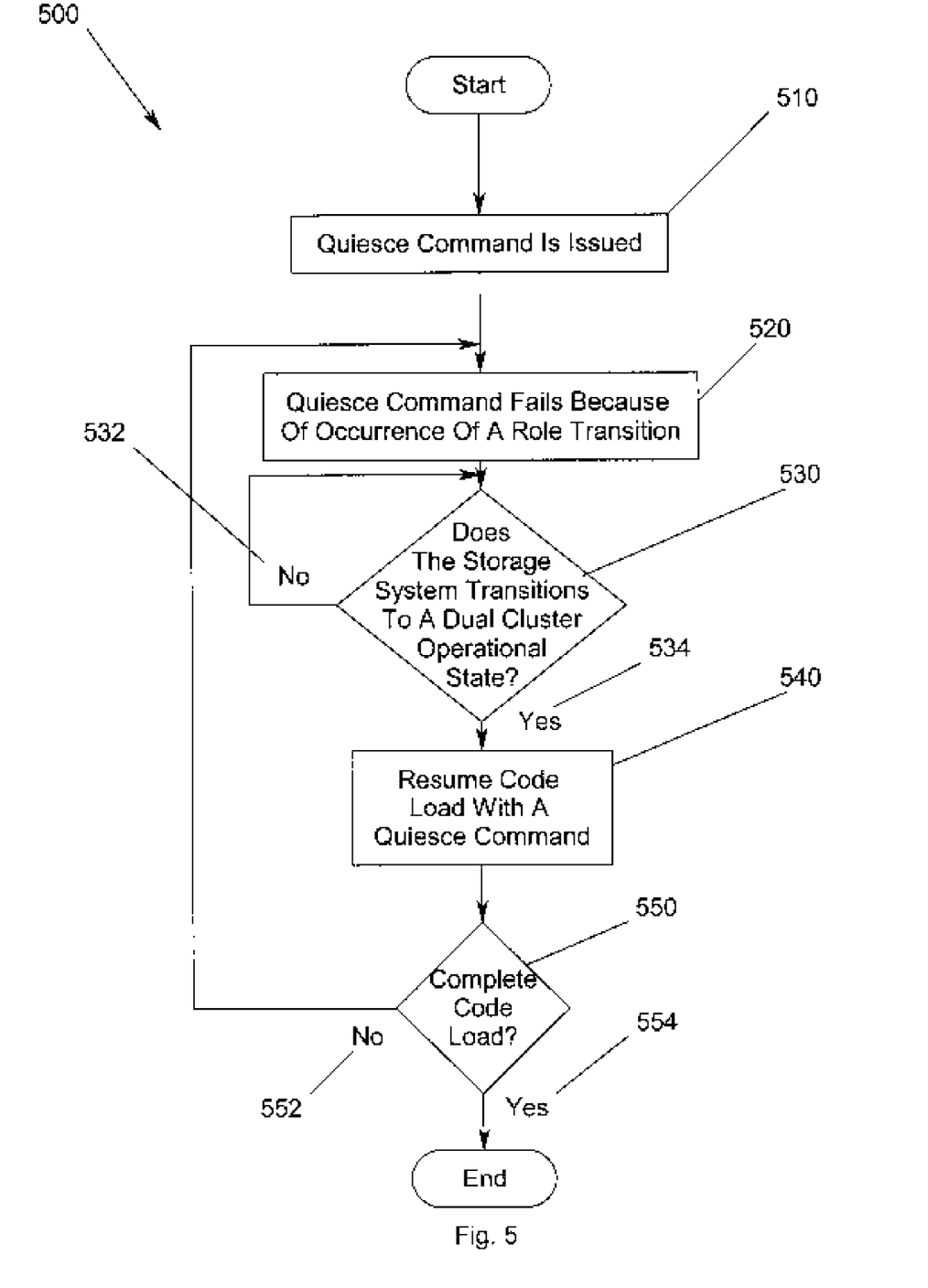
FIG. 5 is a flow chart of a method for performing a quiesce command to provide fault tolerant code upgrades on a fault tolerant system according to an embodiment of the present invention.

FIG. 3 is a flow chart 300 of a method for providing fault tolerant code upgrades on a fault tolerant system according to an embodiment of the present invention. More particular embodiments of the present invention are shown with respect to FIG. 4 showing a method for providing fault tolerant code upgrades on a fault tolerant system when upgrading the functional code to a dual-cluster operational mode or with respect to FIG. 5 showing a method for providing fault tolerant code upgrade on a fault tolerant system when a functional code transition causes the quiesce command to fail.

Fault tolerant system recovery actions are accommodated by the concurrent code-load upgrade process according to an embodiment of the present invention. In order to accommodate the system recovery actions, the code-load process determines when a system recovery action is in process and when the system recovery action has completed. A communication protocol between the functional code and the code-load-code is not provided. Instead, the code-load process monitors the functional-code states, and the code-load persists with its own environmental requirements.

In FIG. 3, a concurrent code-load is initiated 310. While the new code-load is loaded onto a primary and secondary controller, for example, fault tolerance is provided by monitoring the system so that any hardware or software failures are detected. For example, a secondary controller can transition to a primary role to serve requests in the event of failure of the primary controller or if the workload for the primary controller exceeds a predetermined limit. A role transition, such as occurs during a failover, is detected 320. The code-load process determines whether the system returns to a desired state 330.

The code-load process recognizes functional-code events and reacts to the events. The code-load process does not create any intertwined communication channels with the functional-code. Rather, the code-load process recovers from a failure instead of declaring a code-load-failure upon any deviation from an expected scenario. This improves the concurrent code-load success ratio. The concurrent code-load process determines when the transitional state of the functional code settles into a steady state before the code-load-process can continue. The code-load process focuses on identifying two classes of functional-code states: PERSISTENT-GOOD states and PERSISTENT-BAD states. A persistent state is one in which the functional code may remain for an indefinite period of time. An intermediate state is one that the functional code occupies for a short period of time. Intermediate states occur when a specified event occurs, e.g., a failover.

If the functional code does not returns to a desired state 332, the code-load process continues to wait. If the system returns to a desired state 334, the code-load process resumes 340. The functional code will revert back to the previous persistent state prior to the beginning of the transition. By concentrating only on the persistent good state and the persistent bad state (and ignoring the intermediate ones), the functional-code may be changed independently of the code-load code, as long as the important persistent functional-code states are left intact.

FIG. 4 is a flow chart 400 of a method for providing fault tolerant code upgrades on a fault tolerant system when upgrading the functional code to a dual-cluster operational mode according to an embodiment of the present invention. A code-load to change the system to a dual-cluster operational mode via a resume command is initiated 410. While the code-load is being performed to change the system to a dual-cluster operational mode via a resume command, a failover is detected 420. The code-load process determines when the functional code transitions to the single-cluster operational state 430. If the functional code has not transitioned to the single-cluster operational state 432, the code-load process continues to wait. If the functional code transitions to the single-cluster operational state 434, then the code-load process resumes after the transition of the functional code to the single-cluster operational state 440. A determination is made whether the code-load completes 450. If not 452, the process returns to the state that the failover was detected 420. If the code-load completes 454, the process ends.

Accordingly, temporary failures are identified as such and recovery from temporary failures is facilitated instead of announcing a code-load failure. Without implementation of the fault tolerant code upgrades on a fault tolerant system according to an embodiment of the present invention, the code-load would be unaware of the transition and receive a failure return code from the 'resume' command, which would result in a code-load failure.

FIG. 5 is a flow chart 500 of a method for providing fault tolerant code upgrades on a fault tolerant system according to an embodiment of the present invention. In FIG. 5, a quiesce command is issued 510. The initial quiesce fails because of the occurrence of a role transition 520. The code-load process determines when the functional code transitions back to the dual-cluster operational state 530. If the functional code has not transitioned to the dual-cluster operational state 532, the code-load process continues to wait. If the functional code transitions to the dual-cluster operational state 534, then the code-load process continues on its original course with a 'quiesce' command 540. A determination is made whether the code-load completes 550. If not 552, the process returns to the state that the role transition was detected 520. If the code-load completes 554, the process ends.

The foregoing description of the embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A program product comprising a computer readable medium embodying at least one program of instructions executable by a computer to perform operations to provide fault tolerant code upgrades on a fault tolerant system, comprising:
    initiating a concurrent code-load to a plurality of storage controllers of a storage system wherein said initiating includes initiating a command to a storage controller of said plurality of storage controllers;
    detecting a role transition which causes said command to fail;
    determining when the storage system returns to a desired state; and
    resuming the code-load when the storage system returns to the desired state, said resuming including reinitiating said command.

2. The program product of claim 1, wherein the detecting a role transition further comprises detecting a failover.

3. The program product of claim 1, wherein the detecting a role transition further comprises detecting a failback.

4. The program product of claim 1, wherein the initiating a command further comprises initiating a quiesce command to change the storage system to a single-cluster operational mode.

5. The program product of claim 1, wherein the initiating a command includes initiating a resume command to change the storage system to a dual-cluster operational mode, the detecting a role transition further comprises detecting a failover, the determining when the storage system returns to a desired state further comprising determining when the storage system returns to a single-cluster operational state; and the reinitiating said command comprises reinitiating said resume command to change the storage system to a dual-cluster operational mode.

6. The program product of claim 5 wherein the operations further comprise determining whether the code-load completed.

7. The program product of claim 1, wherein the initiating a command further comprises initiating a quiesce command and the detecting a role transition further comprises detecting a failback.

8. The program product of claim 7, wherein the determining when the storage system returns to a desired state further comprising determining when the storage system returns to a dual-cluster operational state.

9. The program product of claim 8, wherein said reinitiating said command further comprises reinitiating said quiesce command to change the storage system to a single-cluster operational mode.

10. The program product of claim 1, wherein the operations further comprise determining whether the code-load completed.

11. A system, comprising:
    a storage system having a plurality of storage controllers which include a processor and a memory, coupled to the processor, the memory comprising a computer usable medium embodying at least one program of instructions to perform operations, the operations comprising:
    initiating a concurrent code-load to the plurality of storage controllers wherein said initiating includes initiating a command to a storage controller of said plurality of storage controllers;
    detecting a role transition which causes said command to fail;
    determining when the storage system returns to a desired state; and
    resuming the code-load when the storage system returns to the desired state said resuming including reinitiating said command.

12. The system of claim 11, wherein the detecting a role transition further comprises detecting a failover.

13. The system of claim 11, wherein the detecting a role transition further comprises detecting a failback.

14. The system of claim 11, wherein the initiating a command comprises initiating a quiesce command to change the storage system to a single-cluster operational mode.

15. The system of claim 11, wherein said initiating a command comprises initiating a resume command to change the storage system to a dual-cluster operational mode, the detecting a role transition further comprises detecting a failover, the determining when the storage system returns to a desired state further comprising determining when the storage system returns to a single-cluster operational state; and the reinitiating said command comprises reinitiating said resume command to change the storage system to a dual-cluster operational mode.

16. The system of claim 15 wherein the operations further comprise determining whether the code-load completed.

17. The system of claim 11, wherein the initiating a command further comprises initiating a quiesce command, the detecting a role transition further comprises detecting a failback, and the determining when the storage system returns to a desired state further comprises determining when the storage system returns to a dual-cluster operational state.

18. The system of claim 17, wherein said reinitiating said command further comprises reinitiating said quiesce command to change the storage system to a single-cluster operational mode.

19. A method for providing fault tolerant code upgrades on a fault tolerant system, comprising:
    initiating a concurrent code-load to a plurality of storage controllers of a storage system wherein said initiating includes initiating a command to a storage controller of said plurality of storage controllers;
    detecting a role transition which causes said command to fail;
    determining when the storage system returns to a desired state; and
    resuming the code-load when the storage system returns to the desired state said resuming including reinitiating said command.

20. The method of claim 19, wherein the storage system has an initial operational mode, and wherein:
    if the initial operational mode is a dual-cluster operational mode, the initiating a command includes initiating a quiesce command to change the storage system to a single-cluster operational mode, the detecting a role transition further comprises detecting a failover, the determining when the storage system returns to a desired state further comprises determining when the storage system returns to a dual-cluster operational state and said reinitiating said command further comprises reinitiating said quiesce command to change the storage system to a single-cluster operational mode; and if the initial operational mode is a single-cluster operational mode, the initiating a command includes initiating a resume command to change the storage system to a dual-cluster operational mode, the detecting a role transition further comprises detecting a failover, the determining when the storage system returns to a desired state further comprising determining when the storage system returns to a single-cluster operational state; and the reinitiating said command comprises reinitiating said resume command to change the storage system to a dual-cluster operational mode; and the method further comprising determining whether the code-load completed.

* * * * *